United States Patent [19]

Kishi et al.

[11] Patent Number: 5,514,448
[45] Date of Patent: May 7, 1996

[54] LAMINATED MOLDING

[75] Inventors: Satoru Kishi; Toshiyuki Nakakura, both of Yokohama; Hiroshi Tanabe, Kamakura; Hideo Sakai, Ebina, all of Japan

[73] Assignee: Mitsui Toatsu Chemicals, Inc., Tokyo, Japan

[21] Appl. No.: 92,794

[22] Filed: Jul. 19, 1993

[30] Foreign Application Priority Data

Jul. 22, 1992 [JP] Japan .................. 4-195177

[51] Int. Cl.$^6$ .................... B32B 1/04
[52] U.S. Cl. ................. 428/166; 428/113; 428/114; 428/140; 428/155; 428/156; 428/167; 428/168; 428/189; 428/190; 428/197; 428/194; 428/304.4; 428/308.8; 428/309.9
[58] Field of Search ................. 428/113, 114, 428/140, 413, 480, 402, 135, 156, 166, 167, 168, 189, 190, 192, 194, 304.4, 308.8, 309.9

[56] References Cited

U.S. PATENT DOCUMENTS 4,229,473 10/1980 Elber .......................... 428/113

Primary Examiner—Patrick J. Ryan
Assistant Examiner—Richard Weisberger
Attorney, Agent, or Firm—Burns, Doane, Swecker & Mathis

[57] ABSTRACT

A molding obtained by laminating resinous plates of 0.05 to 1 mm thick, prepared by impregnating 20% by volume or more of a reinforcing fiber with a thermoplastic resin, and molding the resultant laminate, wherein sections where deviation or deformation is caused by an external force, or preferably nonjoining parts having an area of 5 to 60% based on the area of the location where impact is absorbed, are provided between the laminated layers constituting the molding, or the laminated layer surface where the impact is absorbed is formed with a shape having a curvature of 5 to 20 mm in radius. The molding absorbs impact force significantly and prevents efficiently human body, etc. from the shock upon striking.

6 Claims, 6 Drawing Sheets

LAMINATED MOLDING

BACKGROUND OF THE INVENTION

1. Field of the Invention

This invention relates to a laminated molding which absorbs striking energy due to collision, falling, etc. and displays shock-absorbing effects, and a method for producing the same.

2. Description of the Prior Art

In the collision of automobiles and travelling vehicles, cushioning articles giving shock-absorbing effects absorb the striking energy, functioning as protectors for the machine bodies or the operators.

Cushioning articles having been conventionally used are those formed by laminating a resinous foam on the surface of a structural member, metallic tubes or plates bent or folded in the form of helical springs or bellows, or cylinder-like cushioning devices making use of air pressure or oil pressure.

A metallic cushioning article, cylinder-like cushioning device or helical spring is used in fixing equipment by the cushioning matter itself, for example, in fixing and holding a handle and a shaft. In the case of using a metallic cushioning article, it is necessary to impart a feature to the configuration of its bending or folding section where the energy is absorbed. Further, the structure of the bending or folding section is complicated and its molding is difficult. On the other hand, the cylinder-like cushioning device has a defect in its heavy weight, while the helical spring is faulty in that it accumulates striking energy but releases the energy upon collision to destroy the collided object.

Further, an attempt has been made to use a molding obtained by laminating resinous plates of 0.05 to 1 mm thick, which have been prepared by impregnating 20% by volume or more of a reinforcing fiber with a thermoplastic resin, and molding the resultant laminate. In this case, the molding is lighter in weight than the metallics so that it has been used in a variety of applications as a lightweight cushioning article. However, the molding has involved such problems that it has a lower modulus of elasticity than the metallics so that it is broken by small deformation and absorbs less striking energy.

Therefore, when an impact force over the critical strain of a laminated molding is applied, the laminated molding is broken and fails to buffer the impact force satisfactorily. Since conventional laminated moldings produce a small degree of elastic deformation, they are difficult to buffer a large impact force and hence cannot cope with a wide range of impact forces.

OBJECT AND SUMMARY OF THE INVENTION

The present inventors have made intensive investigations to solve the above-described problems. As a result, it has been recognized that if the conventional laminated moldings of fiber reinforced plastic plates involve defects, such as bubbles, peelings and poor bonding, between the laminated layers, peeling and cracking develop from the defective parts, interlaminar destruction and partial breakage of the reinforcing fiber evolve, and thus the resistance to load does not increase but the displacement increases, when such laminated moldings are deformed under load. In the prior art, it has been a first technical subject to do molding so as not to involve these defects between the laminated layers.

However, the present inventors have noticed that such load-displacement characteristics are a preferred destructive behavior from the viewpoint of buffering impact forces in that the moldings accumulate a large elastic energy, and found that the absorption of striking energy in a composite laminate can be regulated by controlling positively the interlaminar strength of the laminate. The present invention has been completed on the basis of this discovery.

The present invention provides a laminated molding which is obtained by laminating resinous plates of 0.1 to 1 mm thick, prepared by impregnating a reinforcing fiber with a thermoplastic resin in the fiber content of 20% by volume or more, and molding the resulting laminate, wherein sections where deviation or deformation is caused by an external force are provided between the laminated layers constituting the molding.

It is preferable to design the interlaminar adhesion at the sections where deviation or deformation is caused by an external force at 80 or less when the interlaminar adhesion between the areas of the laminated layers where no deviation nor deformation is caused by the external force is taken as 100. A means to embody the design is to provide nonjoining parts on the surface of a laminated layer where deviation or deformation is caused by an external force. A preferred embodiment of the means is to set the area of the nonjoining parts on the surface of a laminated layer where impact is received in the range of 5 to 60% when the area of the laminated layer surface where the impact is received is taken as 100. In this case, where nonjoining parts are provided on a plural number of laminated layers, the area of the nonjoining parts is the sum of that of the nonjoining parts on each of the laminated layers. In a more preferred embodiment of the laminated molding, the laminated layer part where impact is received is molded with a shape having a curvature of 5 mm or more and preferably 20 mm or less in radius.

According to the present invention as described above, there can effectively be obtained a cushioning article which produces a large degree of deformation, starts to break by a relatively small force, and causes a large energy absorption in the breakage by controlling the interlaminar strength between the laminated layers in a composite material formed by laminating prepregs.

DETAILED DESCRIPTION OF THE INVENTION

The resinous plate of the present invention is one which is formed by impregnating the reinforcing fiber with the resin and generally has a thickness in the range of 0.1 to 1 mm. When the resinous plates are laminated into a molding, the thickness of the molding is usually about 1 to 10 mm, more commonly about 3 to 5 mm.

To control the interlaminar strength between the laminated layers, it is advisable to introduce a structure and configuration in which part of the laminated layers is liable to delamination by an external force applied. This is accomplished by providing positive sections where particularly large deformation takes place by the application of an external force.

As a method for controlling the interlaminar strength, it is mentioned to provide a section where release can readily take place partially between the laminated layers. The section where release can readily takes place means a section where the resin in a laminated layer is prevented from contact with that in the neighboring layer so that the bond strength therebetween is significantly reduced. Specifically, this is achieved by disposing resinous films having poor adhesion to the resin used between the layers, by coating the layer partially with a varnish, grease or release agent having poor adhesion to the resin, by disposing a foaming agent which foams at the molding temperature of the prepreg partially between the layers, or by arranging fabrics or nonwoven fabrics with no resin impregnated between the layers.

Figure 2:
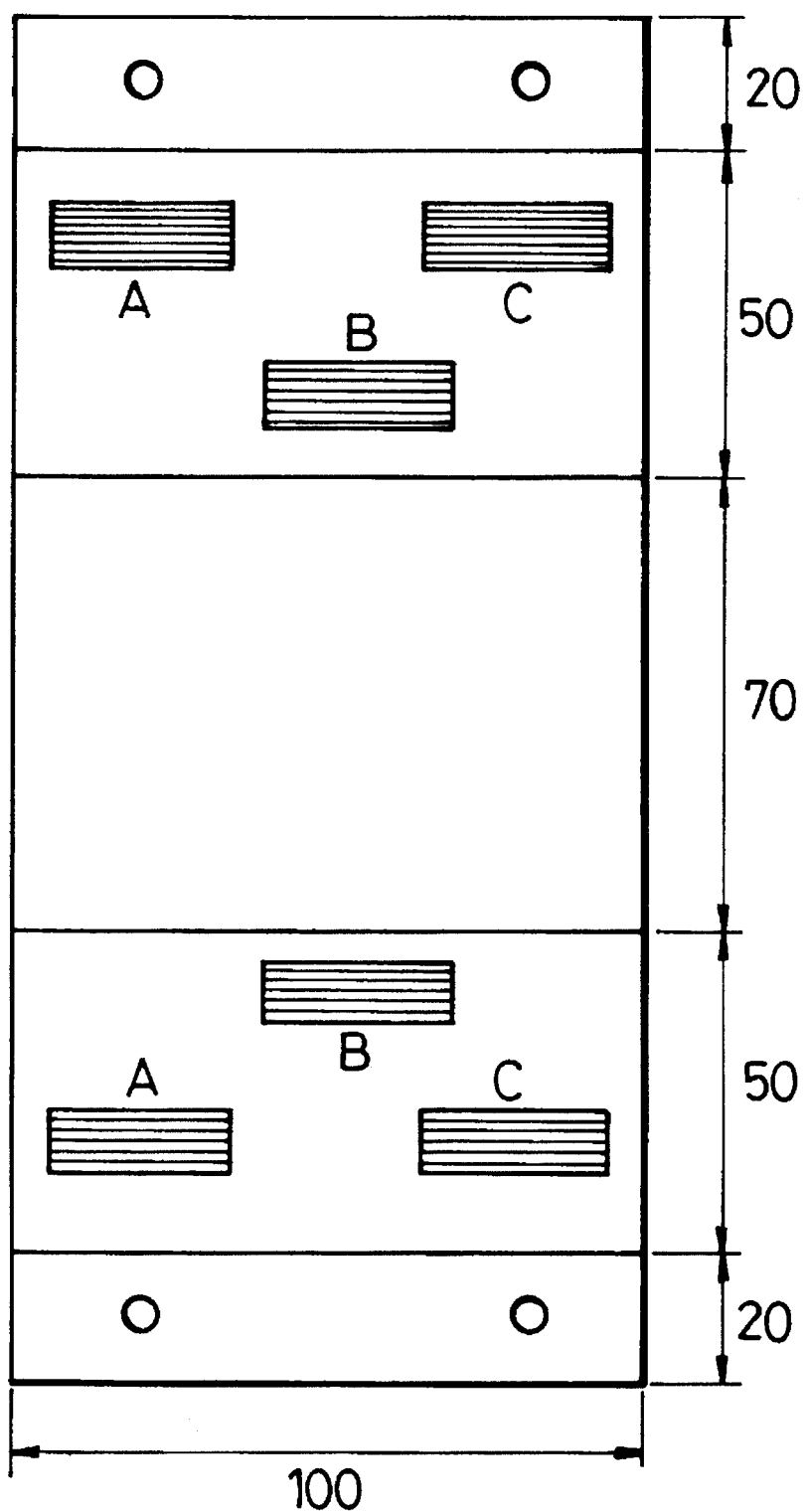
FIG. 2 shows the development of the molding illustrated in FIG. 1.
Figure 6:
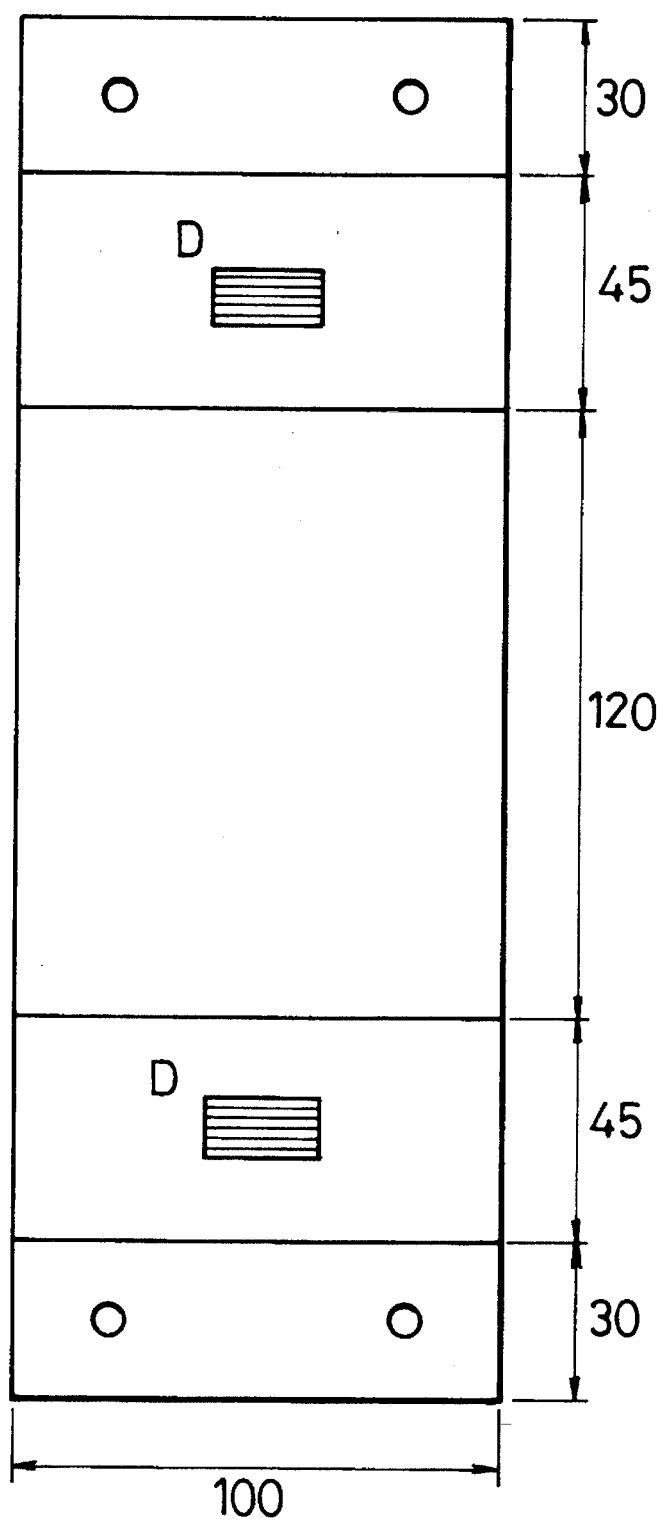
FIG. 6 shows the development of the molding illustrated in FIG. 7.

The area of the nonjoining parts is determined based on the relationship between the strength of the resinous plate containing the reinforcing fiber and the impact force to be absorbed. In general, it is preferably 60% or less, more preferably 5 to 60%, of the area of the surface where the impact force is received. If the area of the nonjoining parts is outside the range of 5 to 60% based on that of the surface where the impact is received, the cushioning effect of the molding can not be obtained sufficiently against the impact force. Preferred number of the release layers is properly selected according to purposes, but is generally in the range of 2 to 5 for each 3 mm of the thickness of the molding. If a plural number of release layers are provided, it is preferable to arrange them in a close relation. The positional relation between the release part and the nonrelease part in the same release layer is determined properly as shown in FIGS. 2 and 6. Nearly the same relation is applied in providing release parts on a plural number of the layers.

In another preferred embodiment, it is also possible to dispose glass fiber fabrics between the layers to reduce the bond strength. Also in this case, the area of the glass fiber fabrics is determined based on the relationship between the strength of the resinous plate containing the reinforcing fiber and the impact force to be absorbed. In general, it is preferably 60% or less of the area of the surface where the impact force is received, and can be designed in almost the same manner as described above. It is however not necessary to be particular about the type of fabric. The fabric may properly be arranged by making use of the direction of the fibers.

As a more preferred method for controlling the interlaminar strength, it is recomendable to provide a part laminated with a laminating angle at which delamination takes place preferentially when a load is applied, in addition to the adoption of the above-described methods.

Figure 7:
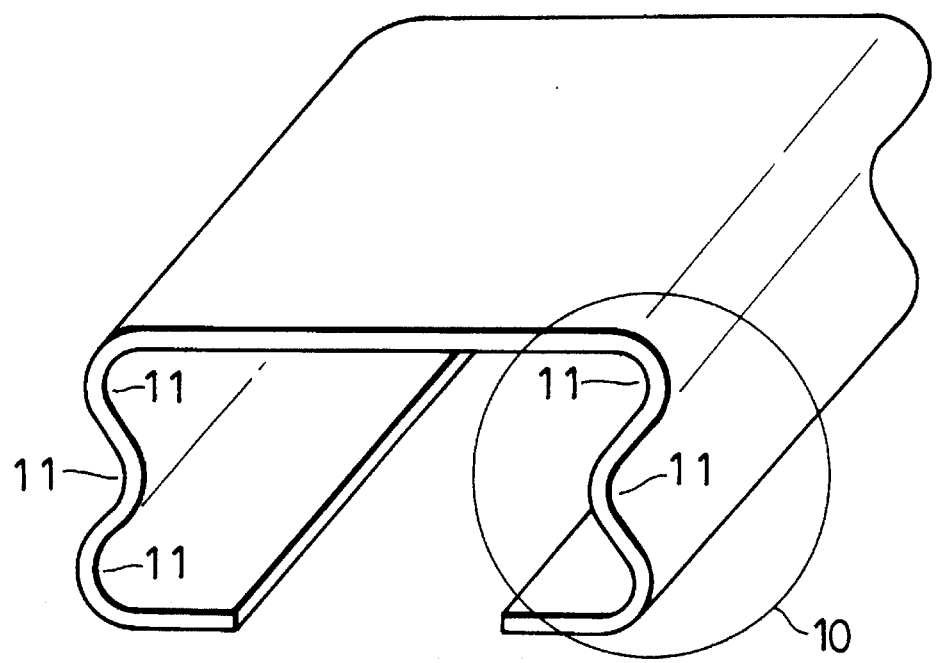
FIG. 7 illustrates a molding in another aspect of the present invention.

Since the deformation in this method does not take place within the laminated layers but in the direction perpendicular to the laminated layers, difference in curvature between the front and rear sides of the laminated molding acts as a trigger for the evolution of deviation within the laminated layers. Practically, this is accomplished by applying partially a corrugated or zigzag turning structure, which does not constitute a surface parallel to the load direction, to the section where the load is received, for instance, the wall section, specifically the surface W in FIG. 1 or the part 10 in FIG. 7. In this case, when the angle of the turning part is too sharp, the load concentrates on the part so that the angle of the turning part is broken prior to the evolution of deviation between the laminated layers. Thus, it is preferable to mold the laminate with a laminating angle having a curvature of 5 mm or more and preferably 20 mm or less in radius in accordance with the situation.

In the molding of the laminated plate, a resinous plate is cut into a given shape of pieces which are then laminated. The laminated body thus formed is molded in an autoclave or by a hot press, as has been done conventionally.

Since the laminated molding of the present invention employs such structure, breakage starts from a specific part of the laminated layers when an external force is exerted on the molding because the interlaminar adhesion is weaker at this part than at other part of the laminated layers. The breakage starts first with the deviation between the laminated layers and results in breakage while absorbing the external force. The shock-absorbing capacity of the molding at this moment is higher than that of the original molding. Further, the elastic modulus upon breakage is low and therefore the shock upon striking is reduced, exhibiting a large effect to protect human body from the shock upon striking.

In the present invention, the reinforcing fiber signifies a fibrous matter, which can be efficacious in improving the strength of the moldings, including a glass fiber, carbon fiber, boron fiber, titanium fiber, alumina fiber, nylon fiber, polyester fiber, polyethylene fiber, aramid fiber, natural fibers such as jute, and metallic fibers such as stainless steel fiber. No particular limitation is imposed on its material so far as it is a fibrous matter. The reinforcing fiber morphologically includes continuous fibers, known as roving yarn and tow, arranged in one direction, and a woven cloth, chopped strand mat or a combination thereof.

In these reinforcing fibers, 200 to 12,000 filaments of 3 to 50 μm in a bundle are used as one unit in general. The content of the fiber is a factor determining the strength of the laminated article and its practicable amount is preferably 20% by volume or more. The content of the reinforcing fiber depends on the strength necessary for the usage applied and the cushioning effect. It is preferably in the range of 20 to 70% by volume, more preferably in the range of 40 to 60% by volume, in view of the molding being generally used as a structure.

Further, it is preferable to apply the surface of the reinforcing fiber with a treating agent for improving the adhesion to the resin, for example, a silane coupling agent alone or a sizing agent containing a silane coupling agent. As the coupling agent for glass fiber, it is necessary to select a best suited one in accordance with the resin to be combined. Specific examples thereof are cited below.

When the resin is of nylon, γ-aminopropyltrimethoxysilane, N-β-(aminoethyl)-γ-aminopropyl-trimethoxysilane are used. For polycarbonate resins, γ-aminopropyl-trimethoxysilane, N-β-(aminoethyl)-γ-aminopropyl-trimethoxysilane are used.

When the resin is polyethylene terephthalate or polybutylene terephthalate, β-(3,4-epoxycyclohexyl)ethyltrimethoxysilane, γ-glycidoxy-propyltrimethoxysilane, γ-aminopropyl-trimethoxy-silane are used.

For polyethylene or polypropylene, vinyltrimethoxysilane, vinyl-tris-(2-methoxyethoxy)silane, γ-methacryloxy-propyltrimethoxysilane, γ-aminopropyltrimethoxysilane are used.

When the resin is polyphenylene oxide, polyphenylene sulfide, polysulfone, polyether-sulfone, polyether-ketone, polyether-ether-ketone, polyimide, polyarylate or fluororesin, it is possible to use N-(β-aminoethyl)-γ- aminopropylmethyl-dimethoxysilane, γ-chloropropylmethyldimethoxysilane, γ-mercaptopropyltrimethoxysilane, p-aminophenyltriethoxysilane, not to mention the above-described coupling agents.

Where the fiber is not a glass fiber, a sizing agent and coupling agent are not used in some cases when the properties are taken first. In such cases, the workability is worsened so that the fiber is often treated with an amino-curable epoxy resin as a coupling agent. Specific examples thereof include a bisphenol A type epoxy resin, epoxy novolak resin, alicyclic epoxy resin, aliphatic epoxy resin and glycidyl ester type resin. To apply the coupling agents onto the surface of fibers, the following process is employed.

Specifically, a fiber, from which a sizing agent is removed, is completely impregnated with a solution containing 0.1 to 3% by weight of a coupling agent by means of dipping, spraying or coating. The fiber impregnated with the coupling agent solution is dried at 60° to 120° C. to react the coupling agent on the surface of the fiber. The drying time is approximately 15 to 20 minutes, during which the solvent is fully volatilized.

The solvent for the coupling agent is water adjusted in pH at approx. 2.0 to 12.0 depending on the coupling agent used, or an organic solvent alone including ethanol, toluene, acetone, xylene, etc., or a mixture thereof.

It is useful to add a modifier which enhances the affinity to the finishing agent, for instance, polypropylene grafted with maleic anhydride, to the resin used for the impregnation.

As the resin of the present invention, both thermoplastic and thermosetting resins may be used. The thermoplastic resins may typically include a polystyrene, styrene-acrylonitrile resin, ABS resin, polyethylene, polypropylene, polycarbonate, polyethylene terephthalate, polybutylene terephthalate, nylon resin, polyphenylene ether, polyphenylene sulfide, polyether-imide, polysulfone, polyether-sulfone, polyimide, polyether-nitrile and polyether-ketone. The typical thermosetting resins are an unsaturated polyester resin, vinyl ester resin, urethane resin, epoxy resin and phenolic resin. It is also possible to use a mixture of the foregoing resins, and resins such as a rubbery elastomeric resin.

It is further possible to use the resin by adding thereto an inorganic material such as whisker, talc, mica, glass short fiber, carbon short fiber or graphite to control the elastic modulus of the resin.

The present invention will be described in more detail by the following typical examples.

EXAMPLE 1

A sheet prepared by disposing 80 glass fiber tows in one direction, each glass fiber tow being formed by bundling 1,800 glass filaments of 13 μm in diameter which had been coated with γ-aminopropyl-trimethoxysilane, was impregnated with a polypropylene resin to prepare a prepreg sheet 1 of 0.05 mm thick whose glass fiber content was adjusted at 50% by volume. The prepreg sheet 1 was cut into 10 prepregs with the dimension as shown in FIG. 2 in such a way that when the direction of fibers in a first prepreg was 0°, the following prepregs took the directions of 90°/0°/90°/0°/0°/90°/0°/90°/0°. These 10 prepregs were laminated in this order from the top. Nylon films of 10 mm wide and 30 mm long (50 μm in thickness) were arranged on the 3rd, 5th and 7th layers from the top in the locations as shown by A, B and C in FIG. 2, thereby forming nonjoining parts. The laminated body thus formed was put in a mold heated to 200° C. and then pressed for 10 minutes at a pressure of 10 kg/cm². The resulting body was cooled down to 50° C. while maintaining the pressure, and then released to obtain a molding shown in FIG. 1.

Figure 1:
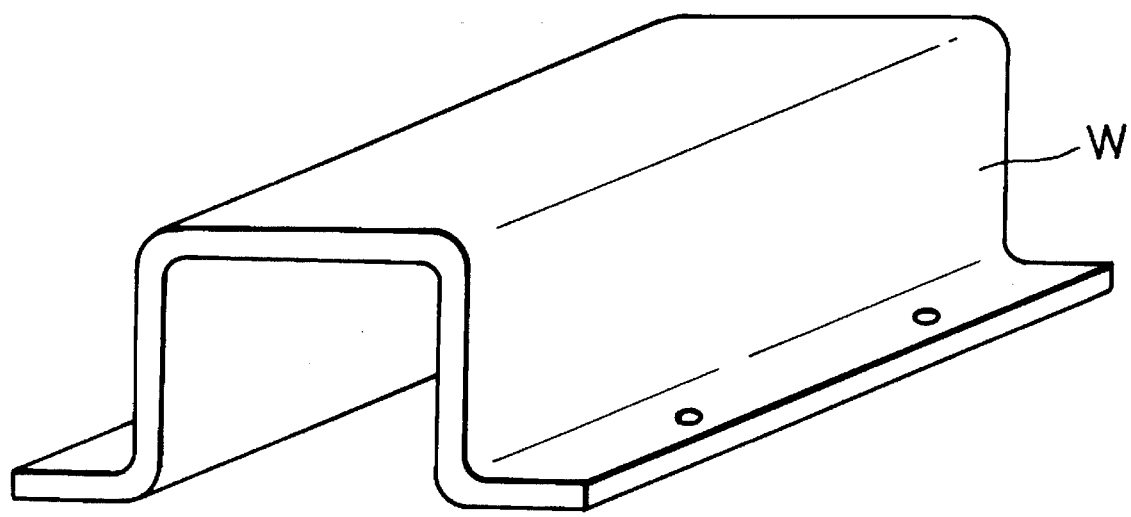
FIG. 1 illustrates a molding in one aspect of the present invention.
Figure 3:
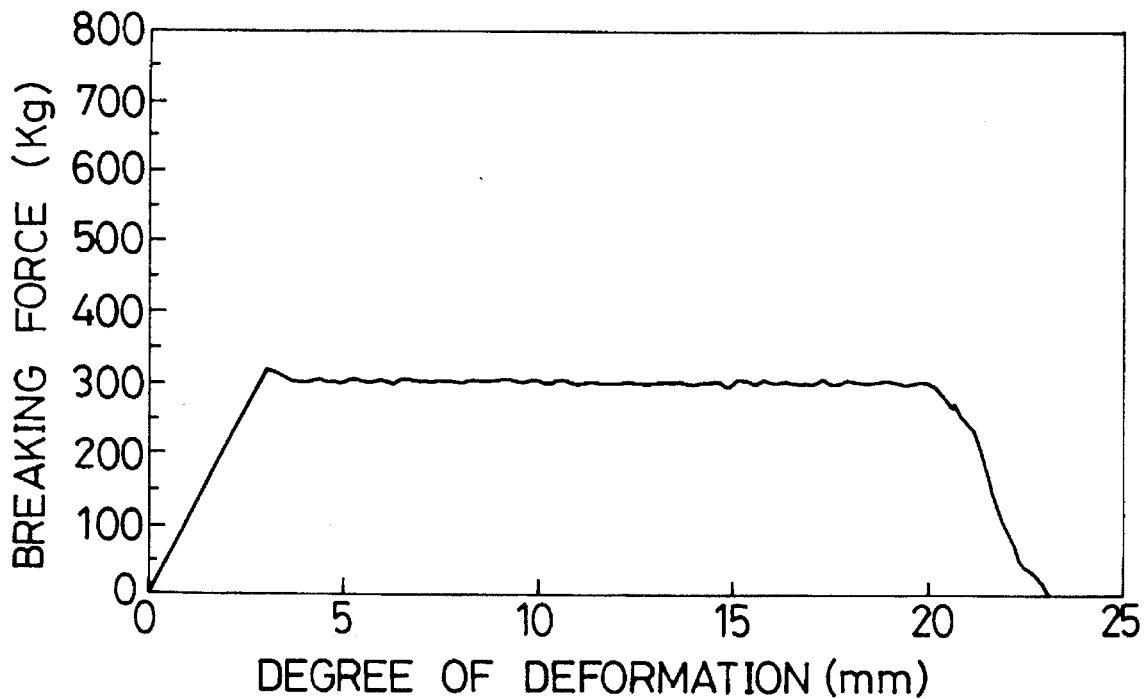
FIG. 3 shows the relationship between the degree of deformation and the breaking force upon compressive breakage of the molding.
Figure 8:
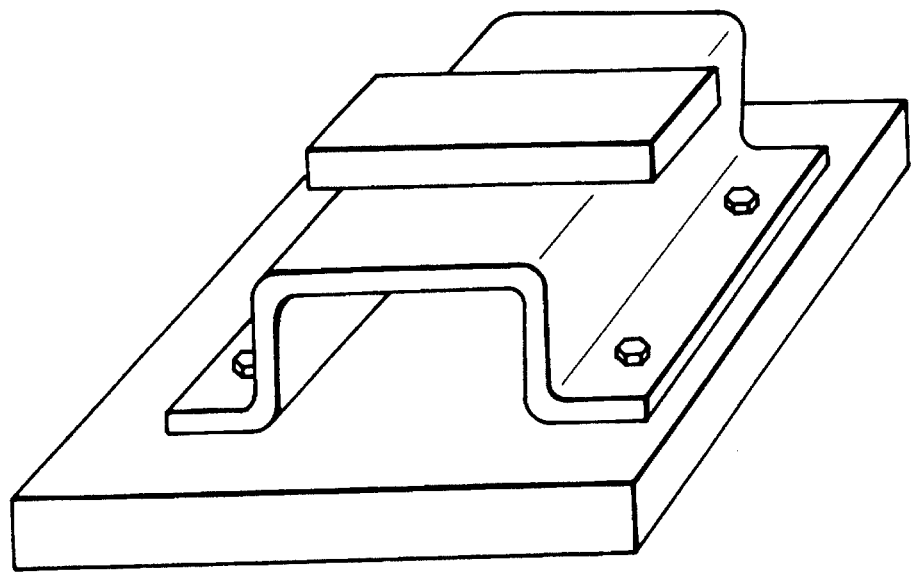
FIG. 8 is a drawing illustrating the fixation of flanges in the compressive test of a molding.

The area of the nonjoining parts was 18% that of the vertical wall section W shown in FIG. 1, where impact was absorbed. The flanges of the molding were fixed by bolts on an iron plate of 150 mm long, 130 mm wide and 20 mm thick as illustrated in FIG. 8. An iron plate of 100 mm long, 100 mm wide and 20 mm thick was placed on the central part of the molding and the load-displacement behavior was measured by applying a compressive load on the top surface thereof by means of a material testing machine of the type 1125 made by Instron Co. The test result revealed that the breaking stress was maintained constant in spite of an increased degree of deflection as shown by the load-displacement curve of FIG. 3, illustrating that the energy absorption was large.

The area surrounded by the base line of the ordinate axis (defined generally as X-axis) and the load-displacement curve is expressively defined as strain energy, and it can be judged that the larger the strain energy, the larger is the cushioning capacity against the impact force. In this case, the strain energy was 61 joul (hereinafter abbreviated as J). Table 1 summarizes the breaking force, the degree of deflection upon breakage and the strain energy.

COMPARATIVE EXAMPLE 1

Figure 4:
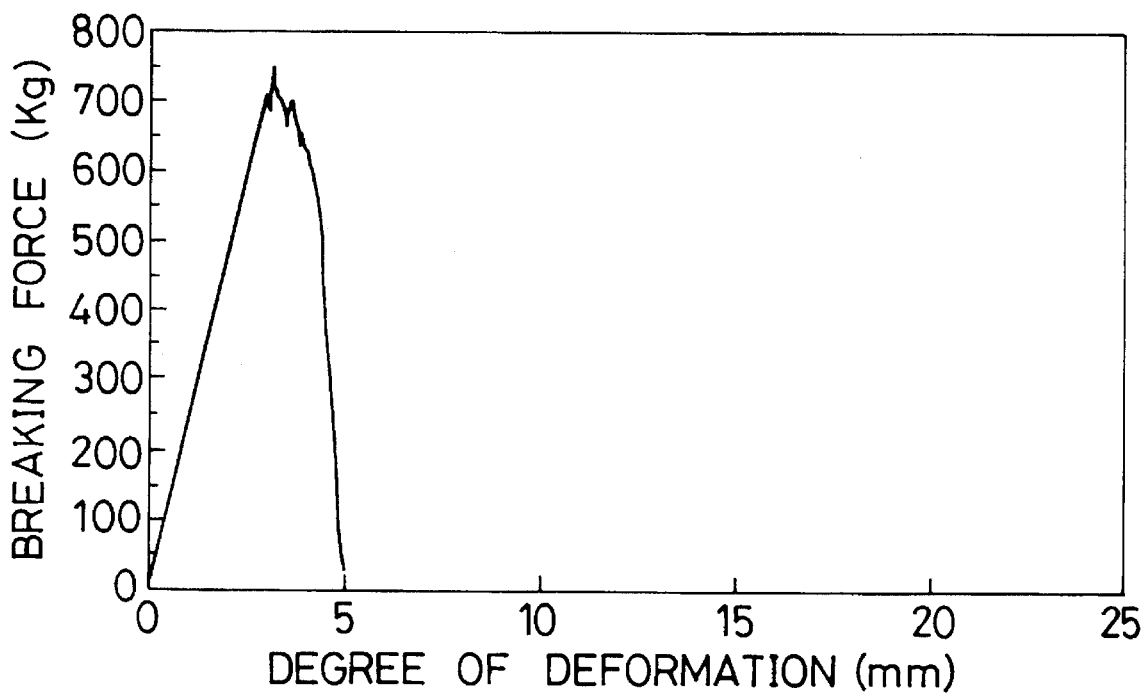
FIG. 4 shows the relationship between the degree of deformation and the breaking force upon compressive breakage of another molding.

A molding was prepared in the same manner as in Example 1 except that no nonjoining parts were provided in the molding. The molding with no nonjoining parts was evaluated in the same manner as in Example 1. As shown in FIG. 4, the breaking initiation force was high and the strain energy was as small as 20 J. Thus, the molding could not be used as a cushioning body. Table 1 summarizes the breaking force, the degree of deflection upon breakage, and the strain energy.

COMPARATIVE EXAMPLE 2

A molding illustrated in FIG. 1 was molded in the same manner as in Example 1, except that the dimension of the nonjoining part was changed to 40 mm wide and 26 mm long. The area of the nonjoining part in this case was 62.4% that of the vertical wall sections W shown in FIG. 1 where the impact was absorbed.

Figure 5:
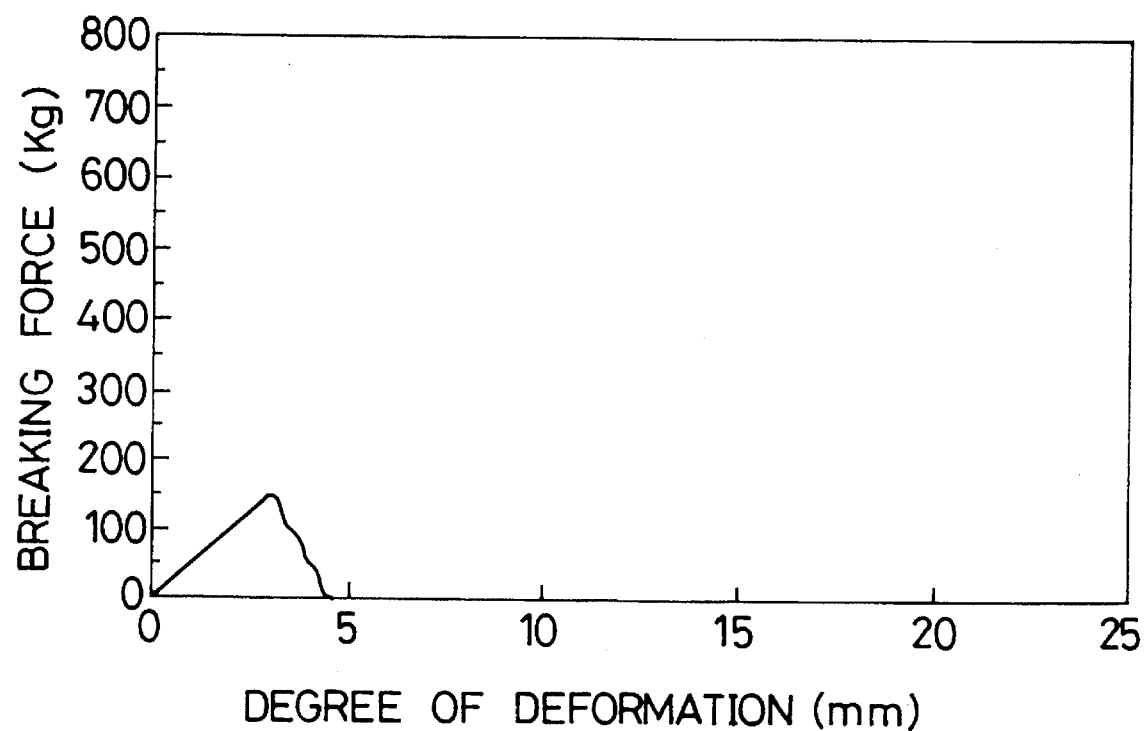
FIG. 5 shows the relationship between the degree of deformation and the breaking force upon compressive breakage of a further molding.

The molding was evaluated in the same manner as in Example 1 and found that the breaking initiation force was low as shown in FIG. 5, the strain energy was as small as 3 J, and therefore the molding could not be used as a cushioning body. Table 1 summarizes the breaking force, the degree of deflection upon breakage, and the strain energy.

EXAMPLE 2

A laminated body was prepared from the prepreg sheet 1 in the same manner as in Example 1 except that a silicone grease KF-54 (product of Shinetsu Silicone Co.) was applied 20 μm thick on the sections A, B and C shown in FIG. 2 in place of the nylon films. The laminated body was molded and subjected to the load test in the same manner as in Example 1. Thus, there was obtained a molding which accumulated a large strain energy and hence could be used as a cushioning medium. Table 1 summarizes the breaking force, the degree of deflection upon breakage, and the strain energy.

EXAMPLE 3

A laminated article was obtained in the same manner as in Example 1 except that glass cloths of 102 g per square meter were applied onto the sections A, B and C in place of the nylon films. The laminated body was molded and subjected to the load test in the same manner as in Example 1. Thus, there was obtained a molding which accumulated a large strain energy and hence could be used as a cushioning medium. Table 1 summarizes the breaking force, the degree of deflection upon breakage, and the strain energy.

EXAMPLE 4

A laminated article was obtained in the same manner as in Example 1 except that polyester nonwoven fabrics of 30 g per square meter was applied on the sections A, B and C in place of the nylon films. The laminated body was molded and subjected to the load test in the same manner as in Example 1. Thus, there was obtained a molding which accumulated a large strain energy and hence could be used as a cushioning medium. Table 1 summarizes the breaking force, the degree of deflection upon breakage, and the strain energy.

EXAMPLE 5

A laminated article was obtained in the same manner as in Example 1 except that a foaming agent of $\alpha,\alpha'$-azobisisobutyro-nitrile was applied 10 μm thick on the sections A, B and C in place of the nylon films. The laminated article was molded and subjected to the load test in the same manner as in Example 1. Thus, there was obtained a molding which accumulated a large strain energy and hence could be used as a cushioning medium. Table 1 summarizes the breaking force, the degree of deflection upon breakage, and the strain energy.

EXAMPLE 6

A laminated body was prepared by laminating 10 layers of prepregs prepared from the prepreg sheet 1, each prepreg having the dimension shown in FIG. 6 and the same direction of fibers as illustrated in Example 1. Here the size of the nonjoining part D in this example was 23 mm multiplied by 10 mm which corresponds to 5.1% the area of the vertical wall section where the load was absorbed. In order to prepare a molding having a corrugated configuration on the vertical wall section as shown by 10 in FIG. 7, as a configuration in which the laminated layers are apt to slide by the application of an external force, the laminated body was put in a mold heated to 200° C. and pressed for 10 minutes at a pressure of 10 kg/cm². The resultant body was cooled down to 50° C. at a cooling rate of 10° C./min while maintaining the pressure and then released to obtain the molding shown in FIG. 7. The molding thus obtained had a curvature radius of 6 mm in the turning parts 11 of the corrugated plates.

A load test was conducted in the same manner as in Example 1. Thus, there was obtained a molding which accumulated a large strain energy and hence could be used as a cushioning medium. Table 1 summarizes the breaking force, the degree of deflection upon breakage, and the strain energy.

COMPARATIVE EXAMPLE 3

A molding was obtained in the same manner as in Example 6 except that the curvature radius of the turning parts 11 of the corrugated plates was changed to 4 mm in the molding. The molding was subjected to the load test in the same manner as in Example 1. It accumulated so small strain energy that it was not suitable for use as a cushioning medium. Table 1 summarizes the breaking force, the degree of deflection upon breakage, and the strain energy.

EXAMPLE 7

The prepreg sheet 1 was cut into 22 prepregs with the dimension as shown in FIG. 6 in such a way that when the direction of fibers in a first prepreg was 0°, the following prepregs took the directions of 90°/0°/90°/0°/90°/0° /90°/ 0°/90°/90°/90°/90°/0°/90°/0°/90°/0°/90°/0° /90°/0°. These 22 prepregs were laminated in this order from the top. Here the nonjoining parts were arranged only between the 11th and 12th layers in this example. The laminated body thus obtained was molded under the same conditions as in Example 1 to obtain a molding illustrated in FIG. 7. The molding was subjected to the load test in the same manner as in Example 1. As a result of the load test, it was found that the deviation of layers occurred only between the 11th and 12th layers from the top, but no deviation was evolved between other layers. Thus, there was obtained a molding which accumulated a large strain energy and could be used as a cushioning medium. Table 1 summarizes the breaking force, the degree of deflection upon breakage and the strain energy.

TABLE 1

|  | Breaking Force (kg) | Deflection upon Breakage (mm) | Strain Energy (J) |
| --- | --- | --- | --- |
| Example 1 | 300 | 23 | 61 |
| Example 2 | 290 | 20 | 48 |
| Example 3 | 260 | 28 | 64 |
| Example 4 | 305 | 25 | 67 |
| Example 5 | 170 | 30 | 45 |
| Example 6 | 315 | 27 | 82 |
| Example 7 | 330 | 21 | 58 |
| Comp. Ex. 1 | 750 | 5 | 20 |
| Comp. Ex. 2 | 160 | 4 | 3 |
| Comp. Ex. 3 | 210 | 12 | 30 |

We claim:

1. A laminated molding comprising:

a plurality of molded laminated resinous plates defining a deformable portion which has a shape having a curvature of 5 to 20 mm in radius and a nondeformable portion, said plates being 0.05 to 1 mm in thickness and comprising a reinforcing fiber impregnated thermoplastic resin having a fiber content of 20% or more in volume; and at least one nonjoining part between two molded laminated resinous plates and occupying from 5 to 60% of the surface area of the deformable portion of said laminated molding, wherein said nonjoining part is not adhered to the resinous plate surface of the laminated molding, such that the degree of lamination of the deformable portion of the laminated molding is 80% or less, as compared to the degree of lamination of the nondeformable portion.

2. The laminated molding as claimed in claim 1, wherein the nonjoining part is nylon film, resinous film, varnish, silicon grease, grease, release agent, foaming agent, fabric, nonwoven fabric, glass fiber fabric, glass cloth, nonwoven polyester fabric, or α, α'-azobisisobutyro-nitrile.

3. The laminated molding as claimed in claim 1 wherein the area occupied by the nonjoining part is the sum of the area of all nonjoining parts when the nonjoining parts are formed on a plural number of laminated layers.

4. The laminated molding as claimed in claim 1 wherein the content of the reinforcing fiber in the laminated molding is in the range of from 20 to 70% by volume.

5. The laminated molding as claimed in claim 1 wherein the surface of the reinforcing fiber is treated with a silane coupling agent or a sizing agent containing a silane coupling agent.

6. The laminated molding as claimed in claim 1 wherein the thermoplastic resin is a polypropylene resin.

* * * * *